Patented July 15, 1930

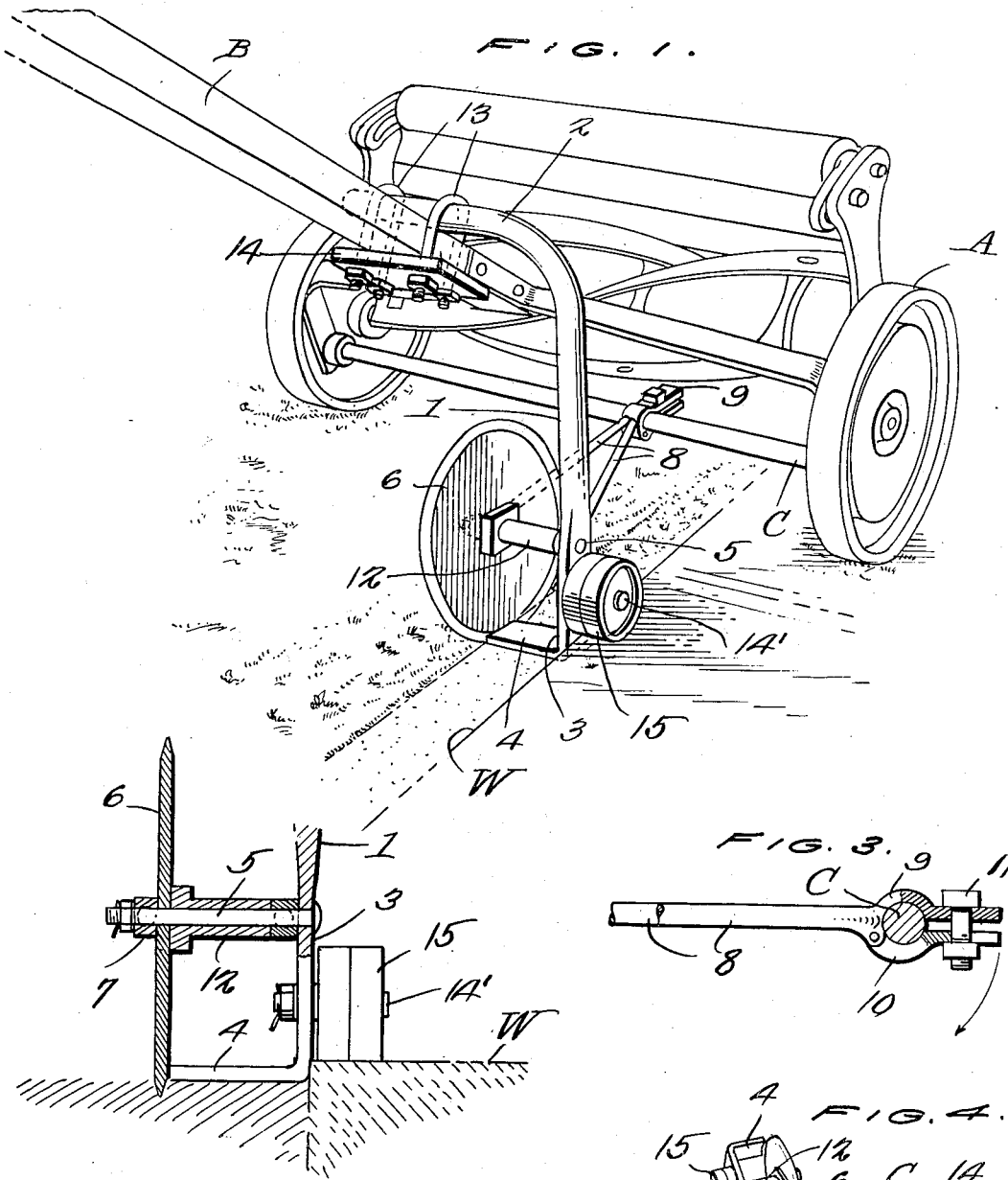

1,770,434

UNITED STATES PATENT OFFICE

MARTIN SCHLEICHER, OF FREMONT, NEBRASKA

LAWN-TRIMMING ATTACHMENT

Application filed June 17, 1929. Serial No. 371,505.

This invention relates to a lawn trimming attachment for lawn mowers, one of its objects being to provide a simple, durable and efficient device that can be applied readily to a lawn mower whereby, when the mower is inverted and pushed along the part to be trimmed, the attachment will cut away and pulverize the sod so as to leave a well-trimmed edge produced with the minimum effort.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a perspective view of the lawn trimmer in use, the same being shown connected to an inverted lawn mower.

Figure 2 is a section through a portion of the attachment.

Figure 3 is a view partly in side elevation and partly in section of a portion of the brace and clamp forming a part of the attachment, the rod to which it is applied being shown in section.

Figure 4 is a perspective view of a lawn mower in its normal position and showing the attachment extended thereabove in inactive position.

Referring to the figures by characters of reference, A designates a lawn mower having the usual handle B and reinforcing or cross rod C.

The structure constituting the present invention includes a metal tube or other suitable device bent to provide a standard 1 merging at one end into a laterally extending arm 2. The other end of the standard is flattened as at 3 and has an integral laterally extending blade 4 constituting a pulverizer and gage.

Extending through the standard and overhanging the blade 4 is a bolt 5 on which a cutting disk 6 is mounted for rotation. This disk works between the ends 7 of brace rods 8 that converge toward and are preferably integral with a clamp member 9. Another clamp member 10 is pivotally connected to the member 9 and a bolt 11 is adapted to draw the clamp members toward each other.

A spacing sleeve 12 is mounted on bolt 5 between disk 6 and that rod 8 nearest standard 1. This sleeve serves to maintain the disk close to the free end of blade 4 below which it projects a short distance.

Arm 2 is adapted to extend across the handle B and to be clamped thereto by U-bolts 13 located at opposite sides of handles B and fastened to a clamping plate 14.

If desired a stud 14' may be bolted to the flat portion 3 of standard 1 to provide a bearing for a gage roller 15. This stud and its roller need not be used under some conditions.

In practice the attachment is fastened to the handle B and to the rod C and so positioned that, when the lawn mover is inverted, the blade 4 will be free to travel between disk 6 and the extreme edge of the lawn to be trimmed. If the lawn is to be trimmed along a walk W it will abut thereagainst as shown. By pushing the lawn mower forwardly and at the same time pressing downwardly on the handle B a sufficient distance to force the disk 6 through the sod, that portion of the sod between the disk and the walk will be severed from the remainder of the lawn and the blade 4 pressing into this severed strip will tend to pulverize it or reduce it to a finely comminuted state so as to leave a substantially clear unsodded space between the walk and the line of the cut. If roller 15 is used the downward thrust will be limited thereby. If it is not used the thrust can be regulated by manipulating handle B.

After the first cutting of sod during the trimming of a lawn it might be desirable to remove the sod to leave a shallow ditch but thereafter every trimming operation will produce a pulverizing action and will not necessitate the removal of any refuse.

When the attachment is not in use the lawn mower can be reversed to bring it to its normal position as shown in Figure 4 at which time the attachment will be supported thereabove.

What is claimed is:

The combination with a lawn mower having a transverse brace rod and a handle of a lawn trimming attachment connected to the lawn mower and adapted to be held in active position by the lawn mower when inverted, said attachment including a standard formed in a single length of material shaped to provide in one piece, a pulverizing blade extending laterally from one end thereof and an arm at the other end, means for detachably and adjustably connecting the arm to the handle, means for detachably and adjustably connecting the standard to the rod, and a cutting disk carried by the standard and extending across one end of the blade, said handle constituting a lever adapted to swing downwardly to transmit downward thrusts to the disk and blade.

In testimony that I claim the foregoing as my own, I have hereto affixed my signature.

MARTIN SCHLEICHER.